United States Patent
Nguyen

(10) Patent No.: US 9,960,720 B2
(45) Date of Patent: May 1, 2018

(54) SYSTEM AND METHOD FOR CONTROLLING A MULTIPHASE ELECTRIC MOTOR WHILE TAKING CURRENT OSCILLATIONS INTO ACCOUNT

(75) Inventor: Thanh Nguyen, St Remy les Chevreuse (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 271 days.

(21) Appl. No.: 14/002,391

(22) PCT Filed: Mar. 29, 2012

(86) PCT No.: PCT/FR2012/050673
§ 371 (c)(1),
(2), (4) Date: Sep. 30, 2013

(87) PCT Pub. No.: WO2012/131269
PCT Pub. Date: Oct. 4, 2012

(65) Prior Publication Data
US 2014/0015460 A1    Jan. 16, 2014

(30) Foreign Application Priority Data

Mar. 30, 2011   (FR) ..................................... 11 52652

(51) Int. Cl.
*H02P 23/12*    (2006.01)
*H02P 7/00*    (2016.01)
(Continued)

(52) U.S. Cl.
CPC .............. *H02P 23/00* (2013.01); *H02P 21/05* (2013.01)

(58) Field of Classification Search
CPC ............... H02P 6/142; H02P 6/06; H02P 6/08
(Continued)

(56) References Cited

U.S. PATENT DOCUMENTS

| | | |
|---|---|---|
| 5,689,166 A | 11/1997 | Nagayama et al. |
| 2002/0180402 A1 | 12/2002 | Koide et al. |

(Continued)

FOREIGN PATENT DOCUMENTS

| | | |
|---|---|---|
| EP | 0 631 373 | 12/1994 |
| EP | 1 263 125 | 12/2002 |

(Continued)

OTHER PUBLICATIONS

French Search Report dated Jan. 31, 2012 in Application No. FR 1152652 Filed Mar. 30, 2011.

(Continued)

*Primary Examiner* — Eduardo Colon Santana
*Assistant Examiner* — Gabriel Agared
(74) *Attorney, Agent, or Firm* — Oblon, McClelland, Maier & Neustadt, L.L.P.

(57) ABSTRACT

A system and method for controlling a multiphase electric motor fitted to a motor vehicle. The motor includes a rotor powered by a voltage chopper or a rotor with permanent magnets and a stator powered by a multiphase voltage inverter. The multiphase voltage inverter is powered via a high-voltage DC bus. The control system receives as an input a torque setpoint of an electric-vehicle computer. The system also includes a system for the dynamic control of the torque setpoint to determine a dynamic correction of torque ripple and a device for determining setpoints for powering the electric motor as a function of the torque setpoint and of the dynamic correction of torque ripple.

12 Claims, 7 Drawing Sheets

Figure 1:
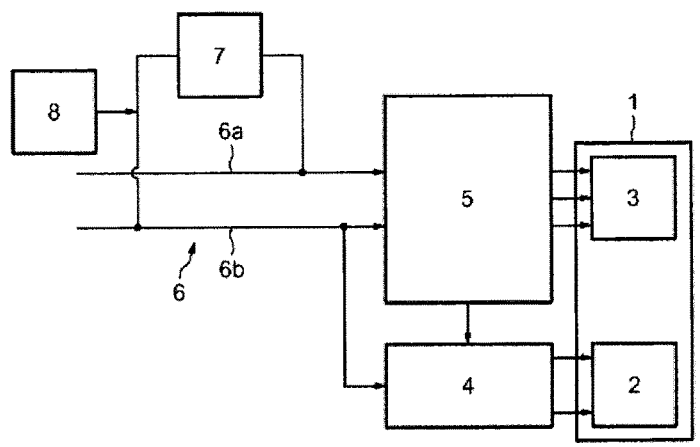

(51) Int. Cl.
*H02P 23/00* (2016.01)
*H02P 21/05* (2006.01)

(58) Field of Classification Search
USPC .................................................. 318/400.14
See application file for complete search history.

(56) References Cited

U.S. PATENT DOCUMENTS

| | | | |
|---|---|---|---|
| 2002/0185989 A1* | 12/2002 | Rahman | H02P 25/098 318/701 |
| 2003/0030404 A1* | 2/2003 | Iwaji | H02P 23/30 318/700 |
| 2008/0084716 A1* | 4/2008 | Ganev | H02M 1/14 363/39 |
| 2008/0167779 A1 | 7/2008 | Suzuki | |
| 2009/0071735 A1* | 3/2009 | Kaneko | B60K 6/26 180/65.285 |
| 2009/0196764 A1* | 8/2009 | Fogarty | F04D 25/0606 417/44.1 |
| 2010/0222953 A1* | 9/2010 | Tang | B60L 15/2036 701/22 |
| 2010/0320945 A1* | 12/2010 | Taniguchi | H02P 23/0004 318/400.02 |
| 2011/0098890 A1* | 4/2011 | Lee | B62D 1/286 701/42 |
| 2011/0163695 A1* | 7/2011 | Schmid | H02J 1/14 315/307 |
| 2012/0112757 A1* | 5/2012 | Vrankovic | G01R 31/025 324/509 |
| 2012/0217916 A1* | 8/2012 | Wu | H02P 21/0003 318/400.11 |
| 2012/0221280 A1* | 8/2012 | Wu | G01R 31/343 702/113 |
| 2012/0249044 A1* | 10/2012 | Linda | B60L 11/1851 318/722 |

FOREIGN PATENT DOCUMENTS

| | | |
|---|---|---|
| EP | 1 906 523 | 4/2008 |
| EP | 1 944 861 | 7/2008 |
| JP | 2002 223582 | 8/2002 |

OTHER PUBLICATIONS

International Search Report dated May 28, 2013 in PCT/FR12/050673 Filed Mar. 29, 2012.

* cited by examiner

SYSTEM AND METHOD FOR CONTROLLING A MULTIPHASE ELECTRIC MOTOR WHILE TAKING CURRENT OSCILLATIONS INTO ACCOUNT

The technical field of the invention is the control of electric motors, and more particularly the control of the electric powering of such motors.

Electric motors have recently taken off as a result of the democratization of hybrid vehicles and of the advances in the marketing of electric vehicles. However, the control systems and methods used in these vehicles sometimes generate current oscillations on the DC high-voltage bus linking the battery to the various members. These current ripples have a negative impact on the electromagnetic compatibility of the electronic power box, on the battery charger and on the accuracy of measurement of the state of charge of the battery. Certain studies show even a negative impact on the service life of the battery.

These current ripples on the high-voltage DC bus also have a negative impact on heating of the capacitor upstream of the static energy converter and hence on its service life.

These current oscillations originate from the torque ripples of the motor and are the source of noises and acoustic and structure-borne vibrations of the electric power train. Note that although the acoustic vibrations are due to the propagation by the air of mechanical vibrations, the structure-borne vibrations are due to the propagation in a solid of mechanical vibrations.

Document FR 2869478 describes a synchronous motor with slight torque ripple and the method for controlling such a motor. Minimizing the torque oscillations is presented in the document as making it possible to improve the quality of the mechanical force created.

There is therefore a need to limit the torque oscillations of the motor that are the source of the noises and acoustic and structure-borne vibrations of the electric power train of a motor vehicle.

One subject of the invention is a system for controlling the power train comprising an electric motor capable of limiting the vibrations due to the oscillations of the motor torque.

Another subject of the invention is a method for controlling a power train comprising a synchronous electric motor capable of limiting the current ripple upstream of the static converter on the DC high-voltage bus, due to the torque oscillations of the motor.

In one embodiment, a system is proposed for controlling a multiphase electric motor fitted to a motor vehicle. This motor comprises a rotor powered by a rotor voltage chopper and a stator powered by a multiphase voltage inverter. The voltage chopper and the multiphase voltage inverter are powered via a DC high-voltage bus, the control system receiving as input a torque setpoint from an electric vehicle computer.

This synchronous motor may also consist of a rotor with permanent magnets, the invention being easily transposable to such a motor.

Also proposed therefore is a system for controlling a multiphase electric motor fitted to a motor vehicle. This motor comprises a rotor with permanent magnets and a stator powered by a multiphase voltage inverter. The multiphase voltage inverter is powered via a DC high-voltage bus, the control system receiving as input a torque setpoint from an electric vehicle computer.

The control system comprises a system for the dynamic control of the torque setpoint that is capable of determining a dynamic correction of torque ripple, and a means for determining setpoints for powering the electric motor as a function of the torque setpoint and of the dynamic correction of torque ripple.

By virtue of this control system, it is possible to eliminate the current ripples of the DC high-voltage bus, which makes it possible to eliminate also the torque ripple of the motor. This improves the acoustic performance of the electric motor.

The means for determining powering setpoints may comprise means for correcting a torque setpoint corrected as a function of the torque setpoint and of the dynamic correction of torque ripple, and a conversion table capable of determining setpoints for powering the motor as a function of the corrected torque setpoint.

The means for determining powering setpoints may comprise a conversion table capable of determining setpoints for powering the motor as a function of the torque setpoint, and means for correcting the powering setpoints as a function of the dynamic correction of torque ripple.

The power setpoints may be current setpoints or voltage setpoints.

The system for the dynamic control of the torque setpoint may receive as input a value of the electric losses at the voltage chopper and the multiphase voltage inverter.

The system for the dynamic control of the torque setpoint may comprise means capable of determining the sum of the power of the electric motor and of the electric losses at the voltage chopper and the multiphase voltage inverter.

The system for the dynamic control of the torque setpoint may receive as input a value of the electric losses at the voltage chopper and the multiphase voltage inverter.

The system for the dynamic control of the torque setpoint may comprise a high-pass filter.

The system for the dynamic control of the torque setpoint may receive as input a dynamic estimate of the torque and a reference torque.

According to another aspect of the invention, a method is proposed for controlling a multiphase electric motor fitted to a motor vehicle. This motor comprises a rotor powered by a rotor voltage chopper and a stator powered by a multiphase voltage inverter. The voltage chopper and the multiphase voltage inverter are powered via a DC high-voltage bus. The powering of the motor is determined as a function of the torque setpoint dependent on the request of the driver. The control method comprises a determination of a dynamic correction of torque ripple and a determination of corrected torque setpoint originating from the subtraction of the dynamic correction of torque ripple from the torque setpoint, the corrected torque setpoint making it possible to determine the powering of the motor.

The method makes it possible to eliminate the current ripple of the DC high-voltage bus powering the voltage chopper and the inverter. The method therefore makes it possible to eliminate the torque ripple of the motor and improve the acoustic performance of the electric motor.

Figure 2:
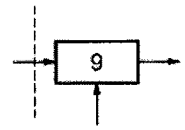
Figure 3:
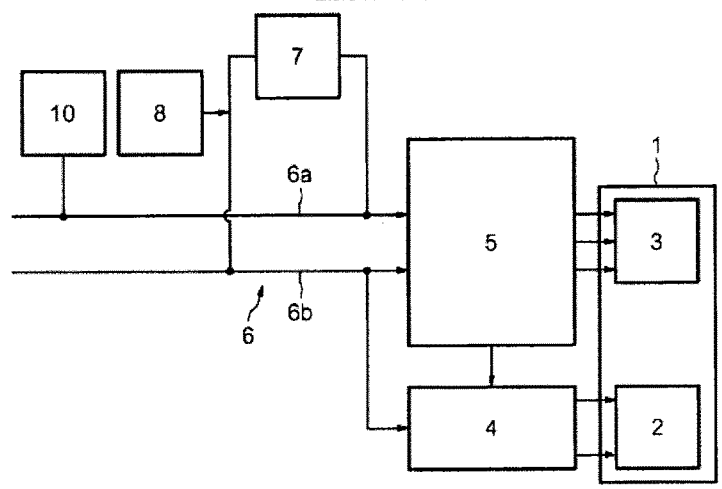
Figure 4:
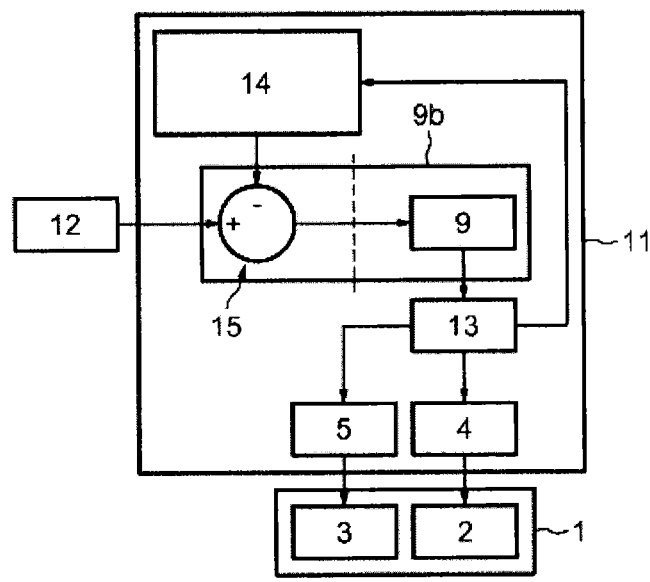
Figure 5:
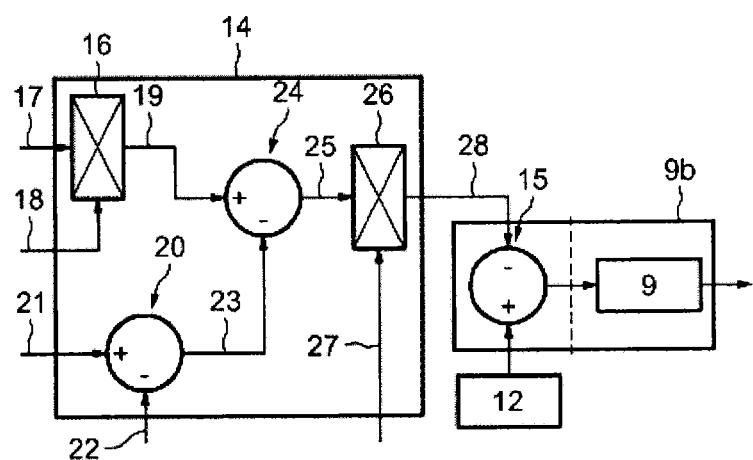
Figure 6:
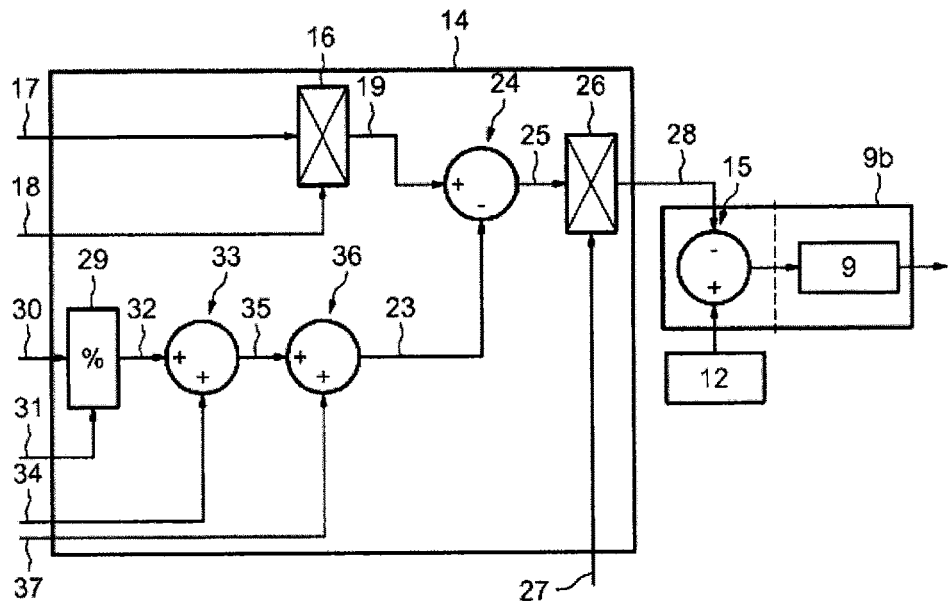
Figure 7:
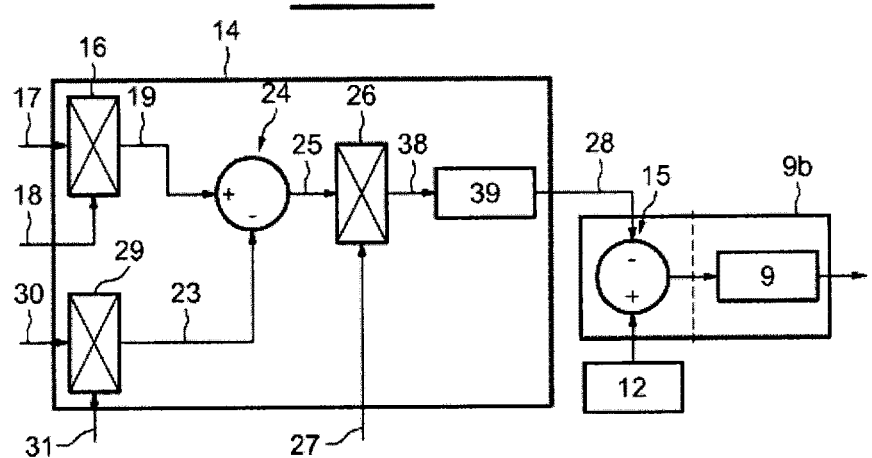
Figure 8:
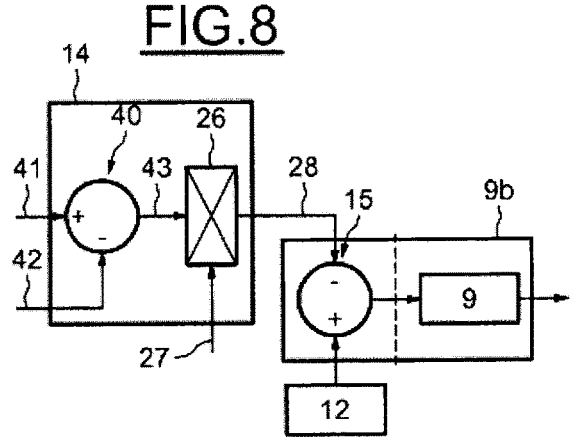
Figure 9:
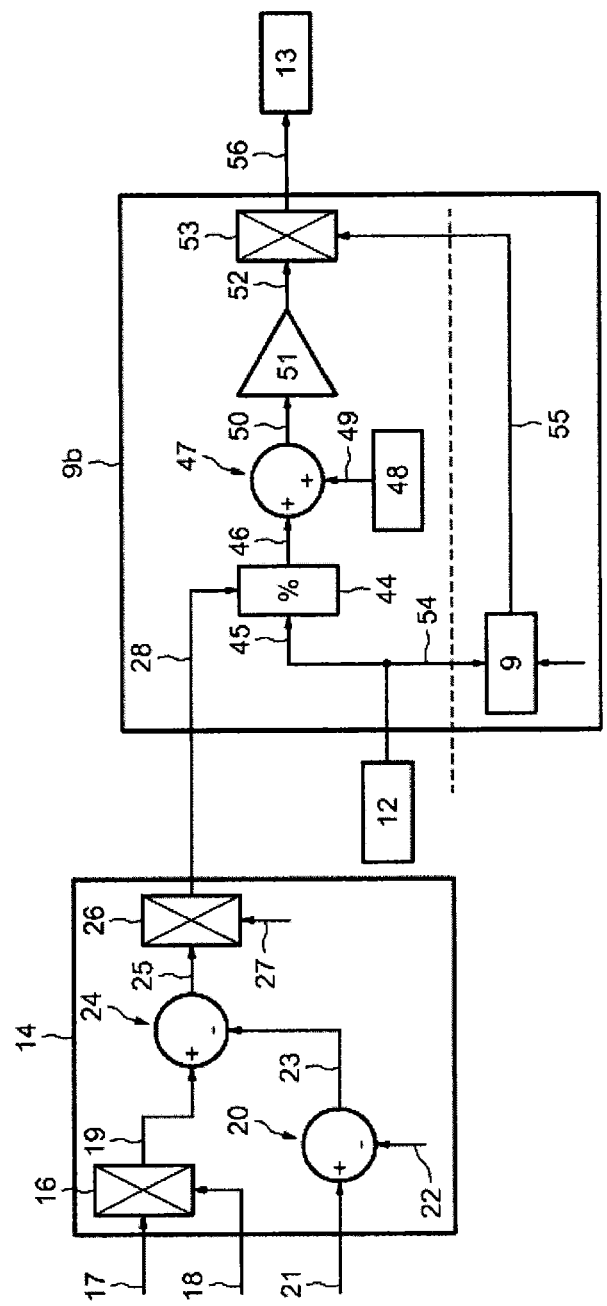
Figure 10:
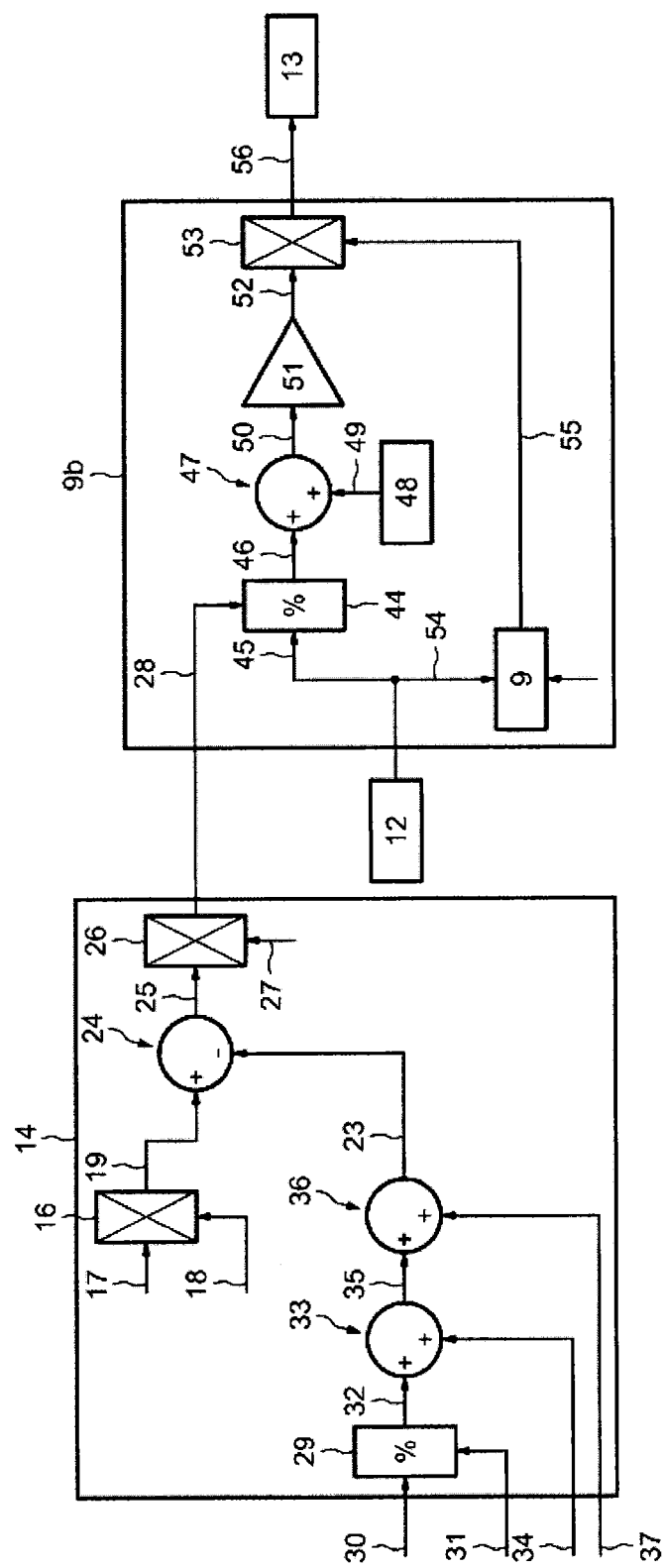
Figure 11:
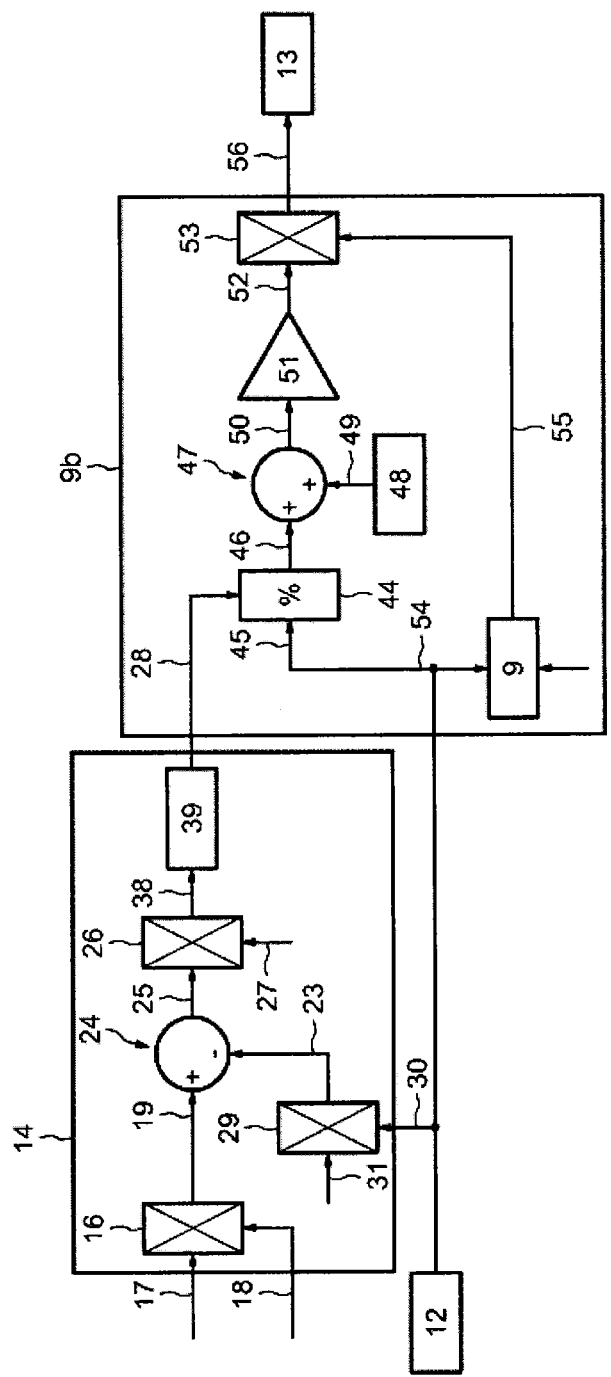
Figure 12:
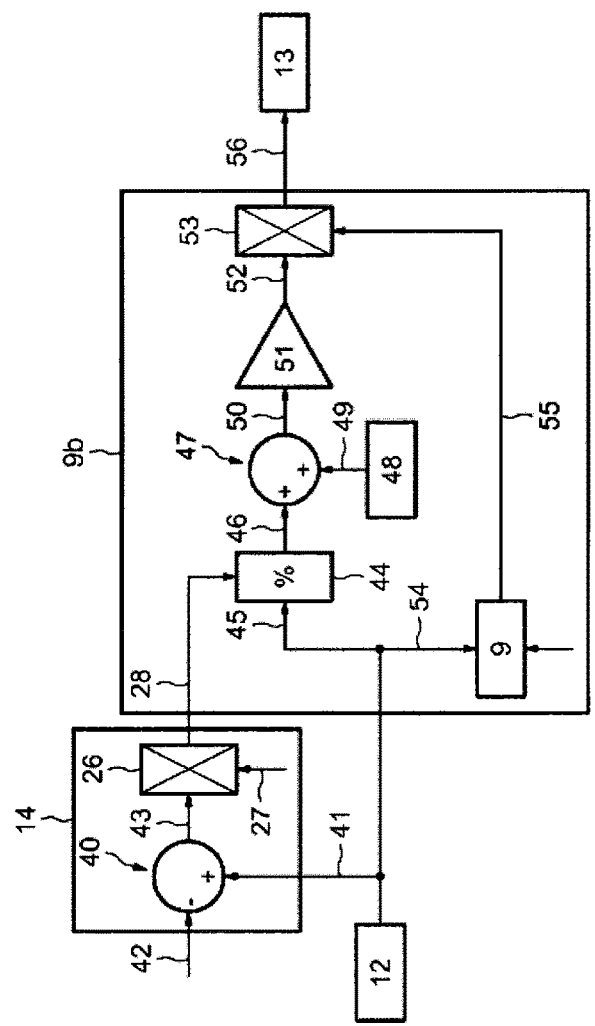

Other objects, features and advantages will become apparent on reading the following description given only as a nonlimiting example and made with reference to the appended drawings in which:

FIG. 1 illustrates the main elements of a system for controlling a three-phase electric motor 1 according to the prior art, FIG. 2 illustrates the elementary structure of controlling the torque of an electric motor, FIG. 3 illustrates the main elements of a system for controlling a three-phase electric motor 1 according to the invention, FIG. 4 illustrates the place of the system for the dynamic control of the torque setpoint of an electric motor in the system for controlling a three-phase electric motor, FIG. 5 illustrates the main elements of a dynamic control system according to a first embodiment, FIG. 6 illustrates the main elements of a dynamic control system according to a second embodiment, FIG. 7 illustrates the main elements of another embodiment of the dynamic control system, FIG. 8 illustrates the main elements of another alternative embodiment of the dynamic control system, FIG. 9 illustrates the main elements of a dynamic control system according to a fifth embodiment, FIG. 10 illustrates the main elements of a dynamic control system according to a sixth embodiment, FIG. 11 illustrates the main elements of a dynamic control system according to a seventh embodiment, and FIG. 12 illustrates the main elements of a dynamic control system according to an eighth embodiment.

An electric motor 1 comprises a movable portion called a rotor 2 and a fixed portion called a stator 3. The stator 3 and the rotor 2 are usually of circular shape, each comprising windings distributed over their periphery. When it is powered, the winding generates a magnetic field of which the polarity depends on the sign of the polarization voltage. The windings of the stator 3 are divided into several phases powered independently from one another. Each phase is powered by a sign-wave voltage that is phase-shifted relative to the voltages applied to the other phases. With an appropriate synchronization, it is possible to generate a succession of magnetic fields having alternated polarities.

In parallel, the rotor 2 is powered by a DC current such that the windings placed on its periphery generate constant magnetic fields. The windings are produced so that there is a succession of fields of alternated polarities.

Thus, when the electric motor 1 is activated, the stator 3 creates magnetic fields attracting and then repelling the magnetic fields of the rotor 2. The rotor 2 is made to rotate.

When the electric motor 1 is used as a source of energy, for example to create the electric energy during braking, it is the induction coupling the stator 3 to the rotor 2 that creates the electric energy. The rotor 2 is powered by a DC current in order to generate constant magnetic fields. When it is made to rotate, the magnetic fields of the rotor 2 induce an AC current in the windings of the stator 3.

FIG. 1 illustrates the main elements of a system for controlling a three-phase electric motor 1 according to the prior art. It shows the movable portion (rotor 2) and fixed portion (stator 3) of a three-phase electric motor 1, respectively supplied with energy by a voltage chopper 4 and a three-phase voltage inverter 5. The voltage chopper 4 and the three-phase voltage inverter 5 are themselves supplied with energy via a DC high-voltage bus 6. The DC high-voltage bus 6 comprises a ground conductor 6a and a positive voltage conductor 6b. The DC high-voltage bus 6 is furthermore connected to the battery of the vehicle, for example a lithium-ion battery. It should be noted that a smoothing capacitor 7 is placed between the ground conductor 6a and the positive voltage conductor 6b in order to dampen the Voltage variations. An armature of the smoothing capacitor 7 is connected upstream of the connection between the positive voltage conductor 6b of the DC high-voltage bus 6, the connection to the voltage chopper 4 and the connection to the three-phase voltage inverter 5. A voltage sensor 8 is connected to the ground and to a point situated between the smoothing capacitor 7 and the positive voltage conductor 6b of the DC high-voltage bus 6.

FIG. 2 illustrates the elementary structure of torque control of an electric motor 1. This structure comprises a conversion table 9 receiving as input the torque setpoint and transmitting as output phase current setpoints (Id_ref,Iq_ref) of the stator 3 in a rotating frame of reference and a current setpoint of the rotor 2 (If_ref). In order to achieve this conversion, the conversion table 9 also takes into account the vehicle speed and the voltage upstream of the smoothing capacitor 7 measured by the voltage sensor 8.

Note that a three-phase electric motor 1 comprises a pair of values of voltage and of current for each phase, the rising and falling edges of the voltage or of the current of one phase being shifted in time relative to those of an adjacent phase.

This phase shift makes it possible to generate alternations of magnetic fields attracting and then repelling the rotor 2 in order to generate a rotation. The values of voltage and of current of the phases of the motor expressed in a fixed frame of reference (x, y) associated with the stator 3 are simplified into a single pair of values of current and of voltage in a rotating frame of reference (d,q) associated with the rotor 2.

FIG. 3 illustrates the main elements of a system for controlling a three-phase electric motor 1 according to the invention.

The control system illustrated by FIG. 3 differs from that illustrated by FIG. 1 in the addition of a means 10 for determining the current of the DC high-voltage bus 6. The other elements referenced in FIG. 3 correspond to the elements bearing the same reference in FIG. 1. Reference will be made to the description illustrated by FIG. 1 for the structural and functional description of these elements.

FIG. 4 illustrates the place of the system 14 for the dynamic control of the torque setpoint of an electric motor 1 in the system 11 for controlling a three-phase electric motor 1, also called an electronic power box.

The system 11 for controlling a three-phase electric motor 1 is connected as an input to the electric vehicle computer (EVC) 12 and as an output to the rotor 4 and to the stator 3 of the electric motor 1. The control system 11 receives from the electric vehicle computer 12 a torque setpoint which is transmitted to the conversion table 9 illustrated in FIG. 2 and included in a means 9b for determining setpoints for powering the motor. The conversion table 9 transmits as output phase current setpoints (Id_ref,Iq_ref) of the stator 3 in a rotating frame of reference and a current setpoint of the rotor 2 (If_ref) to the control means 13 for controlling the electric motor. The control means 13 of the electric motor then transmits commands to inverters included in the voltage chopper 4 and the three-phase voltage inverter 5. The latter then transmit currents to the rotor 2 and the stator 3 of the electric motor 1.

The system 14 for the dynamic control of the torque setpoint of an electric motor 1 is connected as input to the control means 13 of the electric motor and to the input of the means 9b for determining setpoints for powering the motor.

The determination means 9b illustrated in FIG. 4 is limited to a subtractor 15 connected as output to the conversion table 9 and as input to the electric vehicle computer 12 and to the system 14 for the dynamic control of the torque setpoint. However, other structures are described below with respect to FIGS. 9 to 12.

A method for the dynamic control of the torque setpoint of an electric motor 1 associated with the dynamic control system 14 comprises the following steps.

The control method comprises the measurement of the voltage and the measurement of the current of the DC high-voltage bus 6 followed by the computation of the power originating from the product of the current and of the voltage of the DC high-voltage bus 6.

The method continues with the estimation of the stator voltages of the motor ($V_q$, Vd) in the rotating frame of reference (d,q) and the computation of the electric power of the motor as a function of the phase currents of the motor (Id,$I_q$) and of the stator voltages of the motor ($V_q$, Vd).

The electric power of the motor is obtained by applying the following equation:

$$P = 3/2 \cdot (v_d \cdot I_d + V_4 \cdot I_4) \quad \text{(Eq. 1)}$$

where p: electric power of the motor.

The losses of the voltage inverter are then estimated as the sum of the losses by switching and by conduction based on the phase currents, the voltage of the DC bus and the modulation factor of the inverter.

The method continues with the computation of the total electric power originating from adding together the electric power of the motor and the inverter losses.

The difference between the total electric power and the power of the DC high-voltage bus 6 is then determined. The power difference is then divided by the measurement of rotation speed of the motor. The result represents the setpoint of dynamic correction of the torque ripple which must be subtracted from the setpoint of static torque originating from the electric vehicle computer (EVC) 12.

The method is repeated at a frequency equal to that of the regulation loops of the motor control, namely approximately 10 kHz.

It will be noted that the measurement of the voltage of the DC high-voltage bus 6, the estimation of the stator voltages of the motor in the rotating frame of reference, the measurements of the phase currents of the motor and the measurement of the rotation speed of the motor can be determined in other methods forming part of the control of the electric motor 1, notably the methods responsible for the regulation loops of the motor.

FIG. 5 illustrates the main elements of a dynamic control system 14 according to a first embodiment. The dynamic control system 14 comprises a first multiplier 16 receiving as input signals corresponding to the measurement of current of the DC high-voltage bus 6 via the connection 17 and signals corresponding to the measurement of voltage of the DC high-voltage bus 6 via the connection 18. The first multiplier transmits as output via the connection 19 a signal corresponding to the power of the DC high-voltage bus 6.

The dynamic control system 14 also comprises a first summer 20 receiving as input a signal corresponding to the power of the electric motor via the connection 21 and a signal corresponding to the losses of the voltage inverter via the connection 22. The first summer transmits as output a signal corresponding to the total electric power via the connection 23.

A second summer 24 receives on its inputs the signals carried via the connection 19 and the connection 23. The second summer 24 transmits as output via the connection 25 a signal corresponding to the difference between the power of the DC high-voltage bus 6 and the total electric power. A second multiplier 26 receives as input the signal transmitted by the second summer via the connection 25 and a signal relating to the rotation speed of the motor via the connection 27. The second multiplier 26 transmits as output via the connection 28 a signal for correction of the dynamic setpoint of torque ripple corresponding to the ratio of the difference in power transmitted by the second summer divided by the rotation speed of the motor.

The torque ripple dynamic setpoint correction signal is then taken into account by the summer 15 previously described in order to correct the torque setpoint received from the electric vehicle computer 12, the corrected signal being transmitted to the mapping 9.

FIG. 6 illustrates the main elements of a dynamic control system 14 according to a second embodiment in which the determination of the total electric power is replaced by the electric power required as a function notably of the torque setpoint.

This second embodiment has the advantage of a more stable electric power estimate.

A first divider 29 receives as input the rotation speed of the motor via the connection 31 and the torque setpoint via the connection 30. The first divider 29 transmits as output via the connection 32 a signal of estimated mechanical power corresponding to the ratio between the torque setpoint and the rotation speed.

A fourth summer 33 receives as input the signal originating from the first divider 29 via the connection 32 and a signal corresponding to the electric losses of the motor via the connection 34.

The signal originating from the fourth summer 33 via the connection 35 corresponding to the sum of the estimated mechanical power and of the electric losses of the motor via the connection is added by the fifth summer 36 to the losses of the voltage inverter received via the connection 37. The electric losses of the motor are Joule effect losses. The fifth summer 36 transmits as output a signal corresponding to the required electric power. The required electric power is substituted for the total electric power received by the second summer 24 via the connection 23 in the description of FIG. 5.

FIG. 7 illustrates the main elements of another embodiment of the dynamic control system 14.

This embodiment shows an improved stability compared with the previous embodiment, notably by virtue of a power loop that is easier to regulate and a high-pass filter making it possible to select only the useful dynamic portion. The high-pass filter prevents the introduction of possible static errors in obtaining the mechanical torque required for the main loop.

The first divider 29 receives as input the rotation speed of the motor via the connection 31 and the torque setpoint via the connection 30. The first divider 29 transmits as output via the connection 23 a signal of estimated mechanical power corresponding to the ratio between the torque setpoint and the rotation speed.

The estimated mechanical power is substituted for the total electric power received by the second summer 24 via the connection 23 in the description of FIG. 5.

Furthermore, the output signal from the second multiplier 26 is received via a connection 38 by a high-pass filter 39, a corresponding filter signal then being transmitted via the connection 28 to the summer 15 described with respect to FIG. 5. The filtered signal is therefore used as the torque-ripple dynamic-setpoint correction.

FIG. 8 illustrates the main elements of another alternative embodiment of the dynamic control system 14.

This embodiment is more direct than the foregoing in the method of reducing the torque ripple since it consists in making a dynamic correction of torque setpoint without passing through a power loop on the DC bus. It is based on a dynamic-torque estimator based on the knowledge of the voltage harmonics induced from the rotor to the stator which are sources of torque ripple. This mode is therefore more direct and easier to regulate.

An eighth summer 40 receives as input a torque setpoint via the connection 41 and a dynamic estimate of torque via the connection 42. The eighth summer 40 transmits as output via the connection 43 a dynamic-torque-setpoint signal corresponding to the difference between the dynamic estimate of the torque and the torque setpoint.

A second multiplier 26 receives as input the signal transmitted by the eighth summer 40 via the connection 43 and a signal relating to the rotation speed of the motor via the connection 27. The second multiplier 26 transmits as output via the connection 28 a torque-ripple dynamic-setpoint correction signal corresponding to the ratio of the difference between the dynamic estimate of the torque and the torque setpoint transmitted by the eighth summer 40 divided by the rotation speed of the motor.

The torque-ripple dynamic-setpoint correction signal is then taken into account by the summer 15 previously described, in order to correct the torque setpoint received from the electric vehicle computer 12, the corrected signal being transmitted to the mapping 9.

A fifth embodiment is illustrated in FIG. 9. This embodiment is close to the first embodiment illustrated in FIG. 5.

These two embodiments share the same first multiplier 16, first summer 20, second summer 24 and second multiplier 26.

In particular, the dynamic control system 14 comprises a first multiplier 16 receiving as input signals corresponding to the measurement of current from the DC high-voltage bus 6 via the connection 17 and signals corresponding to the measurement of voltage of the DC high-voltage bus 6 via the connection 18. The first multiplier transmits as output via the connection 19 a signal corresponding to the power of the DC high-voltage bus 6.

The dynamic control system 14 also comprises a first summer 20 receiving as input a signal corresponding to the power of the electric motor via the connection 21 and a signal corresponding to the losses of the voltage inverter via the connection 22. The first summer transmits as output a signal corresponding to the total electric power via the connection 23.

A second summer 24 receives on its inputs the signals carried by the connection 19 and the connection 23. The second summer 24 transmits as output via the connection 25 a signal corresponding to the difference between the power of the DC high-voltage bus 6 and the total electric power. A second multiplier 26 receives as input the signal transmitted by the second summer via the connection 25 and a signal relating to the rotation speed of the motor via the connection 27. The second multiplier 26 transmits as output via the connection 28 a torque-ripple dynamic-setpoint correction signal corresponding to the ratio of the difference in power transmitted by the second summer divided by the rotation speed of the motor.

However, the structure of the means 9b for determining setpoints for powering the motor illustrated by FIG. 9 is different from that illustrated by FIG. 5. The determination means 9b comprises a second divider 44 connected as output of the second multiplier 26 via the connection 28. The second divider 44 is also connected as input to the electric vehicle computer 12 via a connection 45. The second divider 44 transmits as output a signal corresponding to the ratio of the signal received from the second multiplier 26 via the signal from the electric vehicle computer 12. The second divider 44 is connected as output via a connection 46 to a ninth summer 47. The ninth summer 47 is connected to a memory 48 via a connection 49. The memory 48 comprises the value 1. The ninth summer 47 is linked as output via the connection 50 to an amplifier 51 carrying out the multiplication of the signal originating from the ninth summer 47 by a value K. The optimal gains of the Kalman filters are obtained in a manner known to those skilled in the art. The amplifier 51 is linked as output via the connection 52 to a third multiplier 53. In parallel, the mapping 9 is linked as input to a branch of the connection 45. The mapping 9 is linked as output via the connection 55 to the third multiplier 53. The third multiplier 53 is linked as output via the connection 56 to an electric motor control means 13.

The elements that are common to the first embodiment make it possible to determine a ripple-dynamic-setpoint-correction signal. The ripple-dynamic-setpoint-correction signal is divided by the torque setpoint by the second divider 44. A torque-ripple-correction factor is transmitted as output from the second divider 44, which is then modulated by a factor K dependent on the amplitude of the desired correction. The modulated torque-ripple-correction factor is then multiplied to a current setpoint of the stator $I_q$, the result being transmitted to the electric motor control means.

Alternatively, the torque-ripple-correction factor may be applied to a voltage setpoint of the stator $V_q$. For this, the modulated torque-couple-correction factor is multiplied to the voltage setpoint of the stator $V_q$, the result being transmitted to the electric motor control means.

This alternative has the advantage of increased speed relative to the modulation of the current setpoint.

A sixth embodiment is illustrated by FIG. 10. The sixth mode shares the first multiplier 16, first summer 20, second summer 24, second multiplier 26, first divider 29, fourth summer 33 and fifth summer 36 with the second embodiment illustrated by FIG. 6. The sixth mode shares the second divider 44, ninth summer 47, memory 48, amplifier 51 and third multiplier 53 with the fifth embodiment illustrated by FIG. 9.

A first divider 29 receives as input the rotation speed of the motor via the connection 31 and the torque setpoint via the connection 30. The first divider 29 transmits as output via the connection 32 an estimated mechanical power signal corresponding to the ratio between the torque setpoint and the rotation speed.

A fourth summer 33 receives as input the signal originating from the first divider 29 via the connection 32 and a signal corresponding to the electric losses of the motor via the connection 34.

The signal originating from the fourth summer 33 via the connection 35 corresponding to the total of the estimated mechanical power and of the electric losses of the motor via the connection is added by the fifth summer 36 to the losses of the voltage inverter received via the connection 37. The electric losses of the motor are Joule effect losses. The fifth summer 36 transmits as output a signal corresponding to the required electric power via the connection 23.

A first multiplier 16 receives as input signals corresponding to the measurement of current of the DC high-voltage bus 6 via the connection 17 and signals corresponding to the measurement of voltage of the DC high-voltage bus 6 via the connection 18. The first multiplier transmits as output via the connection 19 a signal corresponding to the power of the DC high-voltage bus 6.

A second summer 24 receives on its inputs the signals carried by the connection 19 and the connection 23. The second summer 24 transmits as output via the connection 25 a signal corresponding to the difference between the power of the DC high-voltage bus 6 and the total electric power. A second multiplier 26 receives as input the signal transmitted by the second summer via the connection 25 and a signal relating to the rotation speed of the motor via the connection 27. The second multiplier 26 transmits as output via the connection 28 a torque-ripple dynamic-setpoint-correction signal corresponding to the ratio of the difference of power transmitted by the second summer divided by the rotation speed of the motor.

However, the structure of the means 9b for determining setpoints for powering the motor illustrated by FIG. 10 is different from that illustrated by FIG. 5. The determination means 9b comprises a second divider 44 connected as output from the second multiplier 26 via the connection 28. The second divider 44 is also connected as input to the electric vehicle computer 12 via a connection 45. The second divider 44 transmits as output a signal corresponding to the ratio of the signal received from the second multiplier 26 by the signal from the electric vehicle computer 12. The second divider 44 is connected as output via a connection 46 to a ninth summer 47. The ninth summer 47 is connected to a memory 48 via a connection 49. The memory 48 comprises the value 1. The ninth summer 47 is linked as output via the connection 50 to an amplifier 51 carrying out the multiplication of the signal originating from the ninth summer 47 by a value K. The optimal gains of the Kalman filters are obtained in a manner known to those skilled the art. The amplifier 51 is linked as output via the connection 52 to a third multiplier 53. In parallel, the mapping 9 is linked as input to a branch 54 of the connection 45. The mapping 9 is linked as output via the connection 55 to the third multiplier 53. The third multiplier 53 is linked as output via the connection 56 to a means for controlling the electric motor 13.

The ripple-dynamic-setpoint-correction signal carried via the connection 28 is divided by the torque setpoint by the second divider 44. A torque-ripple-correction factor is transmitted as output from the second divider 44, which is then modulated by a factor K dependent on the amplitude of the desired correction. The modulated torque-ripple-correction factor is then multiplied to a current setpoint of the stator $I_q$, the result being transmitted to the electric motor control means.

This embodiment thus benefits from the advantages of determining the power of the second embodiment with the speed of application of correction of the fifth embodiment.

Alternatively, the torque-ripple-correction factor may be applied to a voltage setpoint of the stator $V_q$. For this the modulated torque-ripple-correction factor is multiplied to the voltage setpoint of the stator $V_q$, the result being transmitted to the electric motor control means.

A seventh embodiment is illustrated in FIG. 11.

The seventh embodiment shares the first divider 29, second summer 24 and the first multiplier 16 with the third mode illustrated by FIG. 7. The seventh mode shares the second divider 44, ninth summer 47, memory 48, amplifier 51 and third multiplier 53 with the fifth embodiment illustrated by FIG. 9.

A first divider 29 receives as input the rotation speed of the motor via the connection 31 and the torque setpoint via the connection 30. The first divider 29 transmits as output via the connection 23 a signal of estimated mechanical power corresponding to the ratio between the torque setpoint and the rotation speed.

The estimated mechanical power is substituted for the total electric power received by the second summer 24 via the connection 23 in the description of FIG. 5.

Furthermore, the signal as output from the second multiplier 26 is received via a connection 38 by a high-pass filter 39, a corresponding filtered signal then being transmitted via the connection 28.

As for the embodiments illustrated in FIGS. 9 and 10, the structure of the means 9b for determining setpoints for powering the motor illustrated by FIG. 11 is different from that illustrated by FIG. 5. The determination means 9b comprises a second divider 44 connected as output of the high-pass filter 39 via the connection 28. The second divider 44 is also connected as input to the electric vehicle computer 12 via a connection 45. The second divider 44 transmits as output a signal corresponding to the ratio of the signal received from the second multiplier 26 via the signal from the electric vehicle computer 12. The second divider 44 is linked as output via a connection to a ninth summer 47. The ninth summer 47 is connected to a memory 48 via a connection 49. The memory 48 comprises the value 1. The ninth summer 47 is linked as output via the connection 50 to an amplifier 51 carrying out the multiplication of the signal originating from the ninth summer 47 by a value K. The optimal gains of the Kalman filters are obtained in a manner known to those skilled in the art. The amplifier 51 is linked as output via the connection 52 to a third multiplier 53. In parallel, the mapping 9 is linked as input to a branch 54 of the connection 45. The mapping 9 is linked as output via the connection 55 to the third multiplier 53. The third multiplier 53 is linked as output via the connection 56 to an electric motor control means 13.

The ripple-dynamic-setpoint-correction signal carried via the connection 28 is divided by the torque setpoint by the second divider 44. A torque-ripple-correction factor is transmitted as output from the second divider 44, which is then modulated by a factor K dependent of the amplitude of the desired correction. The modulated torque-ripple-correction factor is then multiplied to a current setpoint of the stator $I_q$, the result being transmitted to the electric motor control means.

The seventh embodiment therefore benefits from the advantages of the third and fifth embodiments.

Alternatively, the torque-ripple-correction factor may be applied to the voltage setpoint of the stator $V_q$. For this the modulated torque-ripple-correction factor is multiplied to the voltage setpoint of the stator $V_q$, the result being transmitted to the electric motor control means.

An eighth embodiment is illustrated in FIG. 12.

The eighth embodiment shares the eighth summer 40 and the second multiplier 26 with the fourth mode illustrated by FIG. 8. The eighth mode shares the second divider 44, ninth summer 47, memory 48, amplifier 51 and third multiplier 53 with the fifth embodiment illustrated by FIG. 9.

An eighth summer 40 receives as input a torque setpoint via the connection 41 and a dynamic estimate of the torque via the connection 42. The eighth summer 40 transmits as output via the connection 43 a dynamic-torque setpoint signal corresponding to the difference between the dynamic estimate of the torque and the torque setpoint.

A second multiplier 26 receives as input the signal transmitted by the eighth summer 40 via the connection 43 and a signal relating to the rotation speed of the motor via the connection 27. The second multiplier 26 transmits as output via the connection 28 a torque-ripple dynamic-setpoint correction signal corresponding to the ratio of the difference between the dynamic estimate of the torque and the torque setpoint transmitted by the eighth summer 40 divided by the rotation speed of the motor.

As for the embodiments illustrated in FIGS. 9 to 11, the structure of the means 9b for determining setpoints for powering the motor illustrated by FIG. 12 is different from that illustrated by FIG. 5. The determination means 9b comprises a second divider 44 connected as output of the second multiplier 26 via the connection 28. The second divider 44 is also connected as input to the electric vehicle computer 12 via a connection 45. The second divider 44 transmits as output a signal corresponding to the ratio of the signal received from the second multiplier 26 by the signal from the electric vehicle computer 12. The second divider 44 is linked as output via a connection 46 to a ninth summer 47. The ninth summer 47 is connected to a memory 48 via a connection 49. The memory 48 comprises the value 1. The ninth summer 47 is linked as output via the connection 50 to an amplifier 51 carrying out the multiplication of the signal originating from the ninth summer 47 by a value K. The optimal gains of the Kalman filters are obtained in a manner known to those skilled in art. The amplifier 51 is linked as output via the connection 52 to a third multiplier 53. In parallel, the mapping 9 is linked as input to a branch 54 of the connection 45. The mapping 9 is linked as output via the connection 55 to the third multiplier 53. The third multiplier 53 is linked as output via the connection 56 to an electric motor control means 13.

The ripple-dynamic-setpoint-correction signal carried via the connection 28 is divided by the torque setpoint by the second divider 44. A torque-ripple-correction factor is transmitted as output from the second divider 44 which is then modulated by a factor K dependent on the amplitude of the desired correction. The modulated torque-ripple-direction factor is then multiplied to a current setpoint of the stator $I_q$, the result being transmitted to the electric motor control means.

The eighth embodiment therefore benefits from the advantages of the fourth and fifth embodiments.

Alternatively, the torque-ripple-correction factor may be applied to a voltage setpoint of the stator $V_q$. For this the modulated torque-ripple-correction factor is multiplied to the voltage setpoint of the stator $V_q$, the result being transmitted to the electric motor control means.

The various embodiments of the dynamic control system make it possible to limit the torque ripple by the application of a dynamically estimated correction.

The invention claimed is:

1. A system for controlling a multiphase electric motor fitted to a motor vehicle, said motor including a rotor powered by a voltage chopper or a rotor with permanent magnets, and a stator powered by a multiphase voltage inverter, the multiphase voltage inverter being powered via a high-voltage DC bus, the system receiving as an input a torque setpoint of an electric-vehicle computer, the system comprising:
    a first circuit for the dynamic control of the torque setpoint, comprising:
        a first sub-circuit configured to determine bus power on the DC bus upstream of the multiphase voltage inverter, and
        a second sub-circuit configured to determine a dynamic correction of torque ripple based on said bus power on the DC bus upstream of the multiphase voltage inverter; and
    a second circuit for determining setpoints for powering the electric motor as a function of the torque setpoint and as a function of the dynamic correction of torque ripple determined by the second sub-circuit.

2. The system as claimed in the claim 1, wherein the second circuit comprises
    a summer circuit for correcting a torque setpoint as a function of the torque setpoint and of the dynamic correction of torque ripple, and
    a conversion table which determines setpoints for powering the motor as a function of the corrected torque setpoint.

3. The system as claimed in claim 1, wherein the second circuit comprises a conversion table which determines setpoints for powering the motor as a function of the torque setpoint, and corrects the powering setpoints as a function of the dynamic correction of torque ripple.

4. The system as claimed in claim 3, wherein the powering setpoints are current setpoints or voltage setpoints.

5. The system as claimed in claim 1, wherein the system for the dynamic control of the torque setpoint comprises a first multiplier which determines a product between a voltage and a current of the DC high-voltage bus, received as inputs.

6. The system as claimed in claim 1, wherein the system for the dynamic control of the torque setpoint comprises a second multiplier which determines a product of a motor speed and of the torque setpoint, received as inputs.

7. The system as claimed in claim 1, wherein the system for the dynamic control of the torque setpoint includes an input which receives as input a value of electric losses at the motor.

8. The system as claimed in claim 1, wherein the system for the dynamic control of the torque setpoint includes an input which receives as input a value of electric losses at the voltage chopper and the multiphase voltage inverter, the voltage chopper being powered via the DC high-voltage bus.

9. The system as claimed in claim 8, wherein the first circuit for the dynamic control of the torque setpoint comprises a first summer which determines a sum of power of electric motor and of the electric losses at the voltage chopper and the multiphase voltage inverter received as inputs to the first summer.

10. The system as claimed in claim 1, wherein the first circuit for the dynamic control of the torque setpoint comprises a high-pass filter.

11. The system as claimed in claim 1, wherein the system for the dynamic control of the torque setpoint includes at least one input which receives as input a dynamic estimate of torque and a reference torque.

12. A method for controlling a multiphase electric motor fitted to a motor vehicle, said motor including a rotor powered by a voltage chopper or a rotor with permanent magnets, and a stator powered by a multiphase voltage inverter, the multiphase voltage inverter being powered via a DC high-voltage bus, the powering of the motor being determined as a function of a torque setpoint dependent on a request of a driver, the method comprising:
    receiving at a first circuit, said torque setpoint;
    determining, in a first subcircuit of the first circuit, bus power on said DC high-voltage bus upstream of the multiphase voltage inverter;
    determining, in a second subcircuit of the first circuit, a dynamic correction of torque ripple based on said bus power on said DC high-voltage bus upstream of the multiphase voltage inverter; and
    determining, in a second circuit, setpoints for powering the motor dependent on the determined dynamic correction of torque ripple and dependent on the received torque setpoint.

* * * * *